A. GEROSA.
LUG FOR POWER PLANT SUPPORT FOR MOTOR VEHICLES.
APPLICATION FILED MAY 9, 1917.

1,263,879.  Patented Apr. 23, 1918.

Inventor
Anthony Gerosa
By William J. Jackson
Attorney

UNITED STATES PATENT OFFICE.

ANTHONY GEROSA, OF NEW YORK, N. Y., ASSIGNOR TO MOTOR DEVELOPMENT COMPANY, OF CHICAGO, ILLINOIS, A CORPORATION OF ILLINOIS.

LUG FOR POWER-PLANT SUPPORTS FOR MOTOR-VEHICLES.

1,263,879.   Specification of Letters Patent.   Patented Apr. 23, 1918.

Application filed May 9, 1917. Serial No. 167,430.

*To all whom it may concern:*

Be it known that I, ANTHONY GEROSA, a citizen of the United States, residing in the city of New York, county of New York, and State of New York, have invented certain new and useful Improved Lugs for Power-Plant Supports for Motor-Vehicles, of which the following is a specification.

In motor vehicles, the power-plant is usually supported with respect to the chassis frame by a three or more point suspension, the connection in most instances being made by means of metallic lugs or ears secured to the lower section of the power-plant casing. Such connections frequently break due to jars and vibrations of the chassis, twisting of the chassis frame, overloading of the motor-vehicle, sudden application of brakes when maintaining high rate of speed and from other causes. In some instances, the breakage is gradual so that the operator is unaware of the fact for some time. In such cases, the bearings and other parts of the motor become badly damaged due to the fact that the propeller parts are not maintained in proper alinement. In any event to remedy such breakage requires the dismantling of the power-plant in order to get at the transmission cover so that a new connection may be effected. Such dismantling is expensive and where the parts in addition are damaged the expense is increased. The mere cost of the connection itself is insignificant but the dismantling is expensive.

The principal objects of the present invention are first, to overcome the above recited disadvantageous features and provide improved power-plant supporting lugs which may be readily applied by unskilled labor in a few moments, and second, to provide inexpensive, simple, efficient lugs for application to a motor-car chassis before or after the ordinary lugs become broken, whereby in case the improved lugs are applied prior to breakage, they will still maintain the motor-transmission and its complemental propeller-shaft in alinement and whereby in case the support is applied after breakage, dismantling of the engine is obviated. With these and other objects in view the invention consists of the improvements hereinafter described and finally claimed.

The nature, characteristic features and scope of the invention will be more fully understood from the following description taken in connection with the accompanying drawings forming part hereof and in which.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1:
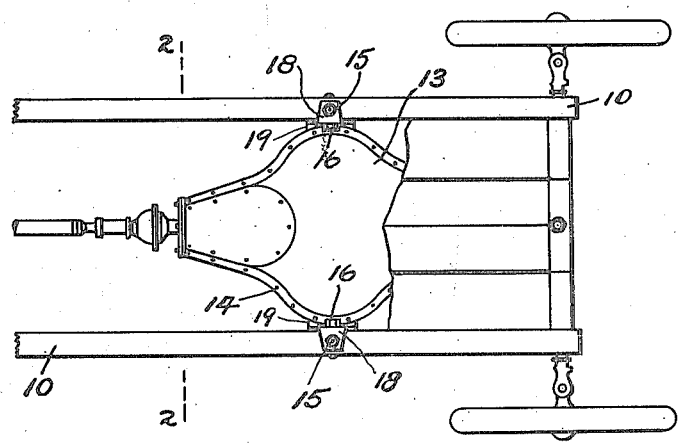
Figure 1 is a fragmentary view in plan of a motor-car chassis equipped with power-plant support lugs of the invention, after breakage of the ordinary lugs.
Figure 2:
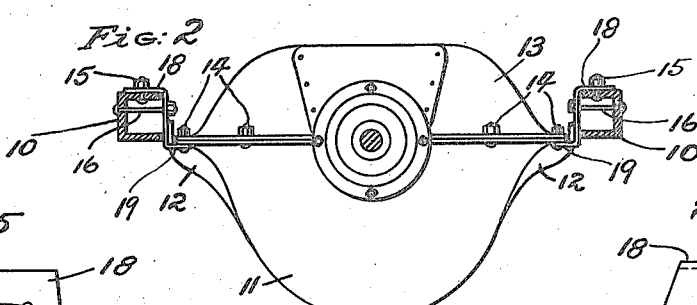
Fig. 2 is a view in cross-section thereof taken upon the line 2—2 of Fig. 1.
Figure 5:
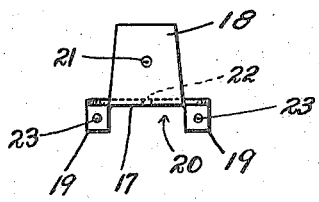
Fig. 5 is a top or plan view of a lug of the invention detached.
Figure 6:
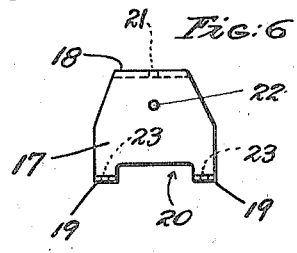
Fig. 6 is an elevational view thereof.

In the drawings and referring to Figs. 1, 2, 3 and 4, 10 designates a motor-car frame. The lower casing 11 of the two-part power-plant housing is supported as by lugs or ears 12, upon the frame 10, the upper casing 13 being supported by the lower casing and the flanged portions of said casings being bolted together as at 14. The lugs or ears 12 may be formed integral with the casing 11 or otherwise secured, the free ends of which are formed angle-iron fashion and are supported by the frame 10 as shown clearly in Fig. 3. Bolts 15 and 16 are employed for securing the free ends of said lugs or ears to place upon the frame 10. The above parts are all of well known construction and according to the present invention I make use of conditions and parts as I find them in applying my improved lugs. The lug is shown in Figs. 5 and 6 as comprising a vertical plate 17 having oppositely extended horizontal extensions. The extension 18 located at the top of the plate is outwardly extended and the two extensions 19 at the bottom of the plate are inwardly extended and have a rectangular shaped opening 20 therebetween, the purpose of which will presently appear In practice, this lug may be formed of heavy sheet metal and may be stamped out in one piece. Bolt holes 21—22 and 23 are provided as shown in Figs. 5 and 6. The edges of the plate 17 and extension 18 may be beveled as shown in order to provide a neat appearance and to lighten construction.

A description will now be given of the application of the lugs of the invention after the ordinary lugs supporting the power-plant have become broken. The weakest part of a lug 12 obviously is the upper portion and breakage mostly occurs as such point and assuming such to be the case a repair is made in the following manner: The bolts 15 and 16 are removed and the upper portion of lug 16 from which the lower portion has broken away is removed so that a lug 12 appears substantially as in Fig. 2. Two bolts 14 immediately adjacent a lug 12 are also removed from the flanged portion of casings 11 and 13. The forked end of my improved lug is now positioned beneath the flange of the lower casing 11, so that the bolt holes 23 of the extensions 19 are in register with the bolt holes from which bolts 14 have been previously removed. In this connection, it is to be observed that the opening 20 between the extensions 19 accommodate the remaining portion of the lug 12 to permit of insertion of said extensions beneath the flange of casing 11. The bolts 14 are now replaced, thus securing the extensions, which are properly spaced apart for this purpose to the flange of the lower casing 11. Thus secured, the upper extension rests upon a channel iron of the frame 10 with its bolt hole 21 in register with bolt hole from which bolt 15 has been removed and the bolt hole 22 of plate 17 is in register with the bolt hole from which bolt 16 has been removed. Bolts 15 and 16 are now replaced. The power-plant is thus supported in a thoroughly efficient manner and the repair may be effected upon the street in a few moments' time by unskilled labor, thus obviating repairs at a garage. The lugs may be readily carried in the usual tool box employed upon motor-cars.

Figure 3:
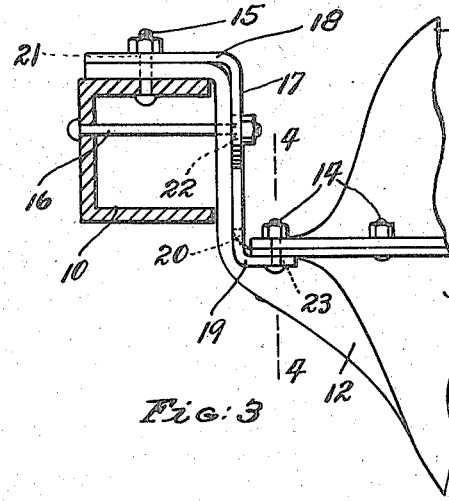
Fig. 3 is a fragmentary view, partly sectioned, illustrating the lugs of the invention applied prior to breakage of the ordinary lugs.
Figure 4:
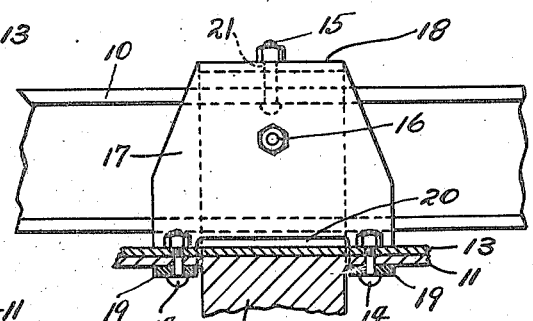
Fig. 4 is a view in section taken upon the line 4—4 of Fig. 3.

A description will now be given of the application of the lugs of the invention before breakage of the usual lugs occurs. This application is shown in Figs. 3 and 4. The same type of lug is employed and is fitted over the ordinary lug as clearly illustrated, the bolts 14—15 and 16 being first removed and then bolted to place as before described. Clearly, breakage of the lugs 12 will have no effect upon the power-plant as thus supported. Obviously, my improved lug may be employed when constructing motor-cars in lieu of present equipment.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modifications in various particulars without departing from the spirit or scope of the invention or sacrificing any of its advantages.

What I claim is:

1. In a motor vehicle construction, the combination of a chassis frame, a flanged power-plant housing, lugs interposed between said frame and housing and secured thereto for supporting the housing, auxiliary supporting lugs having forked ends interposed between the flange of said housing and said frame, the forked portion of such auxiliary lugs straddling the first mentioned lugs and means for clamping said auxiliary lugs to said flange and to the chassis frame.

2. In a motor vehicle construction, the combination of a chassis frame, a flanged power-plant housing, lugs interposed between said frame and housing, auxiliary supporting lugs each embracing a vertical plate having a horizontally disposed forked extension and a top extension, which extensions are oppositely disposed, which auxiliary supporting lugs are interposed between the flange of said house and said frame, the said forked portions straddling a first mentioned lug and the top extensions resting upon the chassis frame, bolts for securing said top extensions and said plate to the chassis frame and bolts for securing said bottom extensions beneath said housing flange.

3. A power-plant housing supporting lug comprising a vertical plate having a relatively wide base, said plate converging to a contracted top, said plate having a horizontal top extension and a horizontal forked bottom extension.

4. A power-plant housing supporting lug comprising an integral member consisting of a vertical tapered plate having a top and bottom extension of which the lower extension is forked, said extensions being oppositely disposed.

5. In a motor vehicle construction, a chassis frame, a two-part power plant housing having flanged portions bolted together, a hanger for the housing bolted to the top and side of the frame in combination with an auxiliary lug for supporting the housing in event of breakage of said hanger comprising an apertured plate having top and bottom extensions, of which the top extension is apertured and is adapted for engagement over the frame top and of which the lower extension is apertured and is shaped and proportioned to engage over at least a portion of said hanger in abutting relation with the underside of said flanged portions, the various apertured portions of said auxiliary lugs alining with said bolts in flanges and frame, whereby the aforesaid bolts may be reëmployed for securing said lug to the flanges of the housing and to said frame.

6. In a motor vehicle construction, the combination of a chassis frame, a power plant housing having flanged portions bolted together and a hanger for the housing bolted to the chassis frame, with an auxiliary lug for supporting said housing in the event of breakage of said hanger comprising an apertured body portion having upper and lower extensions, of which the upper extension is adapted for engagement over the chassis frame top and of which the lower extension is apertured and is shaped and proportioned to engage over at least a part of said hanger in abutting relation with the flanged portion of said housing, the apertures of said auxiliary lug alining with the aforesaid bolts in the frame and housing flanges, whereby said bolts may be reëmployed for securing said auxiliary lug to the chassis frame and to the housing.

7. A power plant housing supporting lug comprising a vertical body portion having an upper and lower horizontal extension, the lower extension being forked to accommodate the housing parts.

8. A power plant housing supporting lug comprising a vertical body portion having an upper and lower horizontal extension, the lower extension being forked and provided with bolt openings and at least the said body portion being provided with an additional bolt opening.

In testimony whereof I have hereunto signed my name.

ANTHONY GEROSA.